United States Patent [19]

Takahashi

[11] Patent Number: 5,224,084
[45] Date of Patent: Jun. 29, 1993

[54] OPTICAL DATA RECORDING AND REPRODUCING APPARATUS WITH PLANE PARALLEL PLATE AND DIFFRACTION GRATING

[75] Inventor: Shinichi Takahashi, Saitama, Japan

[73] Assignee: Pioneer Electronic Corporation, Tokyo, Japan

[21] Appl. No.: 888,820

[22] Filed: May 27, 1992

[30] Foreign Application Priority Data

Nov. 18, 1991 [JP] Japan .................................. 3-301772

[51] Int. Cl.$^5$ .............................................. G11B 7/09
[52] U.S. Cl. .............................. 369/44.23; 369/44.37; 369/112
[58] Field of Search ............... 369/44.12, 44.14, 44.23, 369/44.24, 44.37, 44.38, 44.41–44.42, 54, 109, 110, 112, 120; 359/558, 566, 572

[56] References Cited

U.S. PATENT DOCUMENTS

| | | | |
|---|---|---|---|
| 4,358,200 | 11/1982 | Heemskerk et al. | 369/109 X |
| 4,753,513 | 6/1988 | Shikama | 369/112 X |
| 4,768,183 | 8/1988 | Ohnishi et al. | 369/44.37 X |
| 4,817,072 | 3/1989 | Toide et al. | 369/109 X |
| 5,185,731 | 2/1993 | Takahashi | 369/44.37 X |

*Primary Examiner*—W. R. Young
*Attorney, Agent, or Firm*—Sughrue, Mion, Zinn, Macpeak & Seas

[57] ABSTRACT

An optical data reproducing apparatus in which a light beam is diffracted into three light beams. The three light beams are reflected by a first surface of a plane parallel plate and applied through an objective lens to a recording medium, which forms three signal light beams. The three signal light beams are reflected back to the plane parallel plate and partially reflected by a second surface of the plate. A first optical detector detects one of the three signal light beams, which corresponds to a main light beam of the 0-th order of diffraction. A second optical detector detects the remaining two of the three signal light beams which correspond to auxiliary light beams of the +1st and −1st order of diffraction. The second optical detector outputs a tracking error signal accordingly.

9 Claims, 4 Drawing Sheets

OPTICAL DATA RECORDING AND REPRODUCING APPARATUS WITH PLANE PARALLEL PLATE AND DIFFRACTION GRATING

BACKGROUND OF THE INVENTION

The present invention relates to an optical data recording and reproducing apparatus in which image data signals are recorded on and then reproduced from a recording medium. More particularly, the invention relates to an optical data recording and reproducing apparatus of a three-beam type using a plane parallel plate.

A conventional three-beam type optical data recording and reproducing apparatus is shown in FIGS. 4 and 5. The conventional apparatus includes a light source 1 such as a semiconductor laser for generating a light beam to read data out of an optical disk 100, a diffraction grating 2 for dividing the output light beam of the light source into three light beams, a plane parallel plate 3 for reflecting the three light beams towards the optical disk 100 and for astigmatizing the three signal light beams reflected from the optical disk 100, an objective lens 4 for image-forming the three signal light beams reflected from the plane parallel plate 3 onto a recording surface 101 of the optical disk 100, a concave lens 7 for transmitting the three signal light beams which have passed through the plane parallel plate 3, which increases the distances between those signal light beams, and an optical detector 8 adapted to receive the three signal light beams passing through the concave lens 7.

The operation of the conventional apparatus thus constructed will now be described.

The output light beam of the light source 1 is diffracted by the diffraction grating 2 in three directions corresponding to the zeroth, positive first, and negative first (0-th, +1st and −1st) orders of diffraction and also corresponding to the three light beams described above. The three light beams are reflected by a surface of the plane parallel plate 3 towards the objective lens 4, which focuses the reflected beams onto the recording surface 101 of the optical disk 100. The three light beams are modulated with a variation in reflectivity of the recording surface 101 and converted into signal light beams.

The signal light beams are reflected through the objective lens 4 and the plane parallel plate 3, where they are astigmatized, towards the concave lens 7. The signal light beams are applied to the concave lens 7 at such incident angles that they are focused on a front focal plane 41 (FIG. 5) of the objective lens 4. The concave lens image-forms the signal light beams on the detecting surface of the optical detector 8.

Referring to FIG. 5, without the concave lens 7, the three signal light beams (dotted lines) would focus on the front focal plane 41 with a small distance $L_1$ therebetween. However, because of the diffusion characteristic of the concave lens 7 (which corresponds to the magnification of the concave lens 7), the three signal light beams are image-formed on two photo-diodes (PD) 82 and 83 and a four-division photo-diode (4D-PD) 81 of the optical detector 8 with a distance $L_2$ ($L_2 > L_1$) therebetween.

However, the conventional optical data recording and reproducing apparatus has the following disadvantages. In the conventional apparatus, it is necessary to interpose the concave lens 7 in the optical path to increase the distances between the three signal light beams. But, because of the magnification of the concave lens, the optical path is increased as much as distance $L_3$ as shown in FIG. 5. Consequently, it is very difficult, if not impossible, to miniaturize the optical recording and reproducing apparatus.

The above-described disadvantages may be eliminated by another conventional optical recording and reproducing apparatus wherein a concave lens is used. In this case, the signal light beams which pass directly through the first surface (i.e., the top side in FIG. 4) and through the second surface (i.e., the bottom side in FIG. 4) of the plane parallel plate 3 are detected with a first optical detector. On the other hand, the signal light beams which pass through the first surface and are reflected by the second surface back through the first surface are detected with a second optical detector.

In the latter conventional optical data recording and reproducing apparatus, the three signal light beams emerging from the first surface of the plane parallel plate advance towards the light source. Hence, the second optical detector must be positioned extremely close to the light source (the distance therebetween being 1 to 15 mm). However, when the second optical detector is positioned so close to the light source, it blocks the output light beam of the light source. This "mechanical interference" is a problem.

SUMMARY OF THE INVENTION

Accordingly, it is a general object of the present invention to provide an optical recording and reproducing apparatus which is free of the above-mentioned problems and disadvantages.

It is also an object of the invention to provide an optical data recording and reproducing apparatus in which the output light beam of the light source is free from mechanical interference, and which can be miniaturized as a whole.

In accordance with the above and other objects, the present invention provides an optical image recording and reproducing apparatus including a light source for generating a light beam to read data from the recording surface of a recording medium, a diffraction grating for diffracting said light beam into three light beams comprising a main light beam of the 0-th order of diffraction, a first auxiliary light beam of the +1st order of diffraction, and a second auxiliary light beam of the −1st order of diffraction, a plane parallel plate comprising a first surface in parallel with a second surface, said three light beams being reflected by said first surface towards said recording surface of said recording medium and formed into three signal light beams, said signal light beams then being transmitted back to said plane parallel plate wherein said signal light beams are partially reflected by said second surface, a first optical detector for detecting said main light beam of said signal light beams passing through said second surface of said plane parallel plate and for outputting an RF signal and a focus servo control signal, and a second optical detector for detecting said first and second auxiliary light beams reflected by said second surface and transmitted through said first surface of said plane parallel plate and for producing a tracking error signal.

DESCRIPTION OF THE PREFERRED EMBODIMENTS

A preferred embodiment of the invention will be described with reference to FIGS. 1 through 3.

Figure 1:
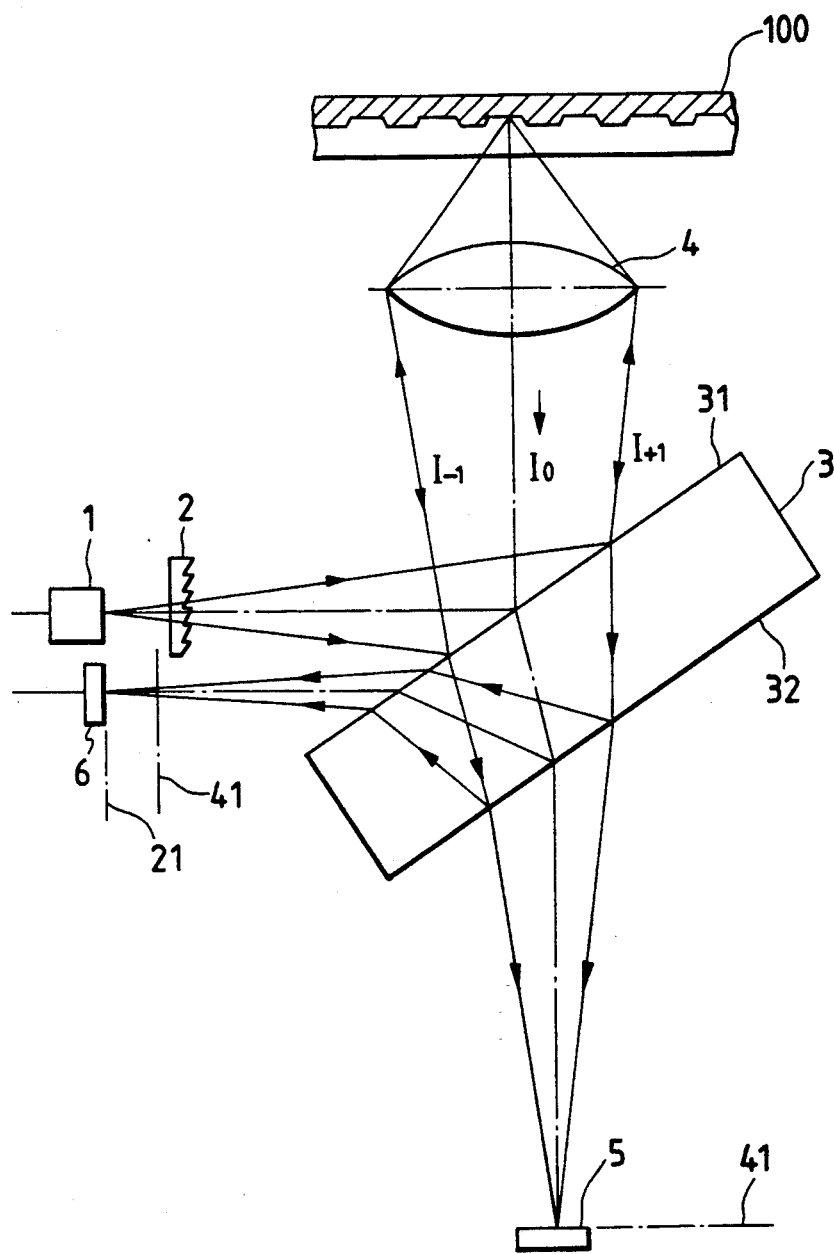
FIG. 1 illustrates an optical data recording and reproducing apparatus according to a preferred embodiment of the present invention.

FIG. 1 shows an optical data recording and reproducing apparatus, which includes a light source 1, a diffraction grating 2, a plane parallel plate 3, an objective lens 4, and first and second optical detectors 5 and 6 for detecting the signal light beams emerging from the plane parallel plate 3. The plane parallel plate 3 is a transparent medium having first and second surfaces 31 and 32 which are inclined in the direction of diffraction and in parallel with each other.

The output light beam of the light source 1 is divided into three light beams of the 0-th, +1st, and −1st orders of diffraction, which are reflected by the first surface 31 of the plate 3 and applied to the optical disk 100 via the objective lens 4. The three light beams are converted into three signal light beams when reflected by the recording surface 101 of the optical disk 100. The three signal light beams are applied to the first surface 31 of the plane parallel plate 3 and transmitted through to the second surface 32. In this operation, a first portion of the three signal light beams pass through the plate 3 towards the first optical detector 5. A second portion of the three signal light beams are reflected by the second surface 32 back through the first surface 31 towards the diffraction grating 2 and the second optical detector 6.

The first optical detector 5 has a four-division photodiode (4D-PD) disposed thereon in a front focal plane 41 of the objective lens 4 in such a manner that it confronts the second surface 32 of the plane parallel plate 3. The detector 5 detects the main light beam $I_0$ (of the 0-th order of diffraction) of the three signal light beams emerging from the second surface 32 of the plane parallel plate 3 and outputs an RF signal and a focus servo control signal.

The second optical detector 6 has two photo-diodes 61 and 62 which are located behind the front focal plane 41 of the objective lens 4 and near caustic curves provided by astigmatism in such a manner that they confront the first surface 31 of the plane parallel plate 3. The first photodiode 61 is an elongated rectangular light receiving element which is large enough to receive the caustic curve of the one $I_{+1}$ of the three signal light beams corresponding to the auxiliary light beam of the +1st order of diffraction. Similarly, the second photodiode 62 is an elongated rectangular light receiving element which is large enough to receive the caustic curve of the signal light beam $I_{-1}$ corresponding to the auxiliary light beam of the −1st order of diffraction. The term "caustic curve provided by astigmatism" as used herein defines a curve which, in a bundle of rays, is formed by connecting the points where rays are concentrated with high density.

Figure 2:
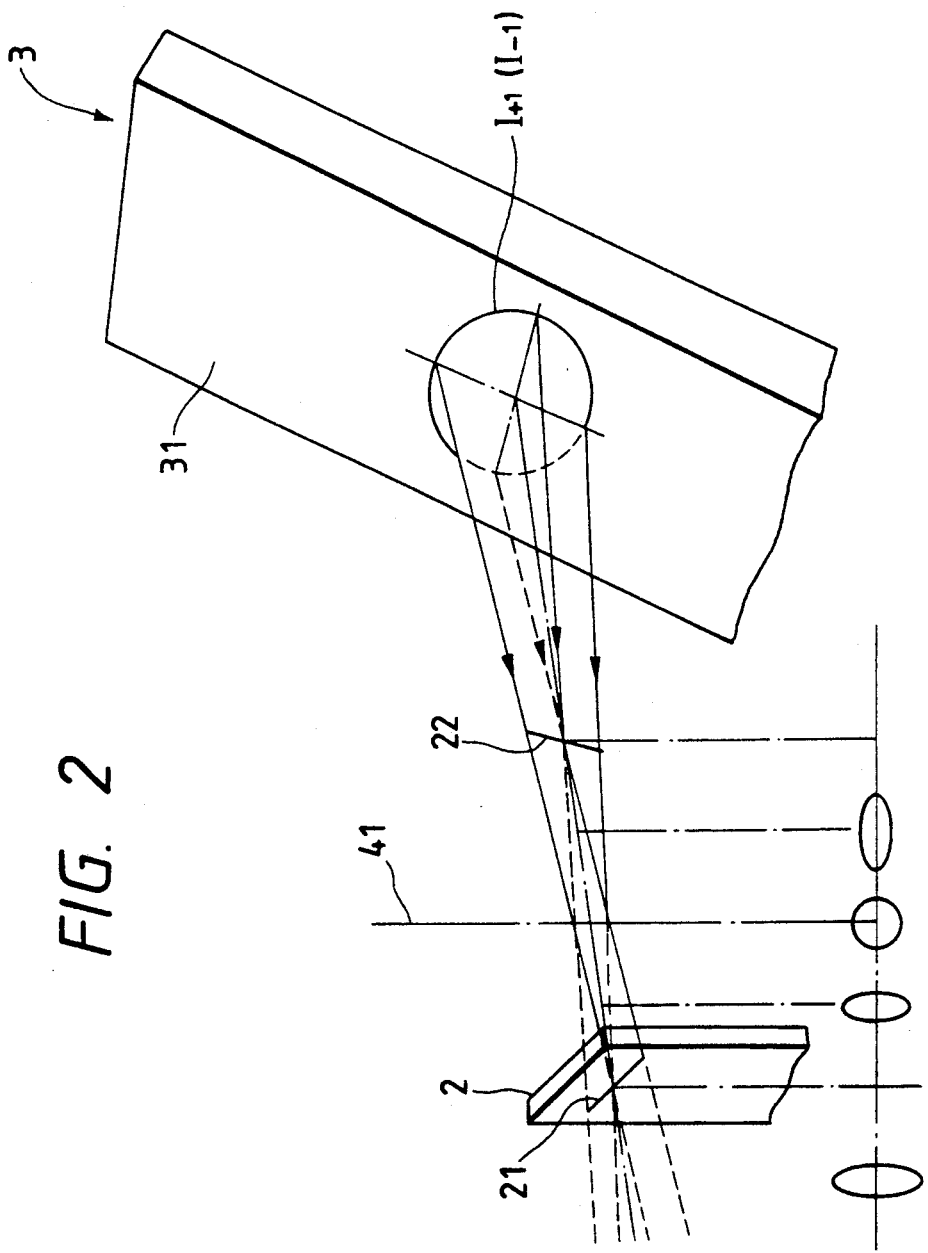
FIG. 2 illustrates the reception of light by a second optical detector in the apparatus shown of FIG. 1.

The three beams are focused to a focus line 22 by the astigmatizm and again focused to a focus line 21 which is rotated from the focus line 22 by 90° as shown in FIG. 2.

The operation of the optical data recording and reproducing apparatus thus constructed will be now described.

First, the output light beam is diffracted in three directions corresponding to the 0-th, +1st, and −1st orders of diffraction. The three light beams are reflected by the first surface 31 of the plane parallel plate 3 through the objective lens 4 towards the optical disk 100. The objective lens 4 serves to focus the three light beams on to the recording surface 101 of the optical disk 100 so that they are modulated with the variation in reflectivity of the recording surface 101 into three signal light beams $I_0$, $I_{+1}$, and $I_{-1}$.

A portion of the three signal light beams $I_0$, $I_{+1}$, and $I_{-1}$ are transmitted through the plane parallel plate 3 while being subjected to astigmatism so that they are applied to the four-division photo-diode (4D-PD) of the first detector 5. The remaining portion of the three signal light beams are reflected by the second surface 32 of the plane parallel plate 3 while being subjected to astigmatism, and transmitted through the first surface 31, and applied to the two photodiodes 61 and 62 of the second detector 6.

Of the three signal light beams, the signal light beam $I_0$ corresponding to the main light beam is received by the four-division photo-diode, which provides an RF signal and a focus servo signal in a conventional manner.

Of the three signal light beams $I_0$, $I_{+1}$ and $I_{-1}$ which emerge from the first surface of the plane parallel plate 3, the signal light beams $I_{+1}$ and $I_{-1}$ are detected through the caustic curves by the two photo-detectors 61 and 62, which provide a detection signal. The second optical detector 6 outputs a tracking servo control signal according to the detection signals thus provided.

The light detecting operation according to different embodiments of the second optical detector 6 will be described with reference to FIGS. 2 and 3.

Figure 3A:
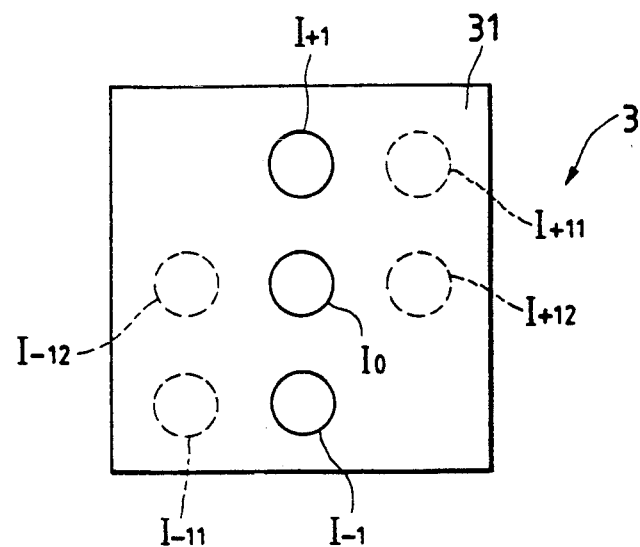
FIG. 3A shows an enlarged diagram to illustrate the reception of light by a plane parallel plate in the apparatus of FIG. 1.
Figure 3B:
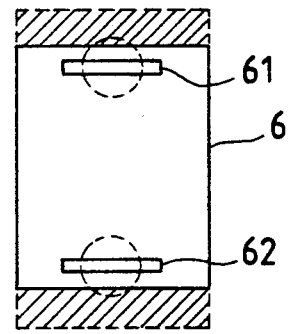
FIGS. 3B–3D illustrate enlarged diagrams showing examples of a second optical detector.

In the case where the signal light beams, when applied to the second optical detector 6, are arranged in a vertical manner as indicated by $I_0$, $I_{+1}$, and $I_{-1}$ in FIG. 3A, the photodiodes 61 and 62 are vertically positioned in parallel as shown in FIG. 3B so as to detect the caustic curves of the signal light beams $I_{+1}$ and $I_{-1}$, respectively. As is apparent from FIG. 3B, the signal light beams are of a circular image-form on the front focal plane 41 of the objective lens 4, while the images of the caustic curves thereof are of a linear image-form.

Accordingly, the second optical detector 6 can be miniaturized in an amount corresponding to the shaded portion. The miniaturization of the second optical detector eliminates any blockage of the optical path of the output laser beam of the light source 1 which is a problem with conventional devices. Furthermore, for similar reasons, other components can be arranged with a greater degree of freedom.

Figure 3C:
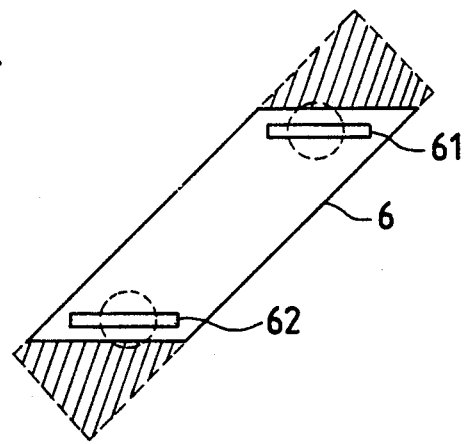

In the case where the signal light beams, when applied to the second optical detector 6, are arranged in a diagonal manner as indicated by $I_0$, $I_{+11}$, and $I_{-11}$ (FIG. 3A), the photodiodes 61 and 62 are positioned as shown in FIG. 3C to detect the caustic curves of the signal light beams $I_{+11}$ and $I_{-11}$, respectively. In this case, the shaded parts of the detector shown in FIG. 3C can be eliminated, and the second optical detector 6 can be miniaturized a corresponding amount.

Figure 3D:
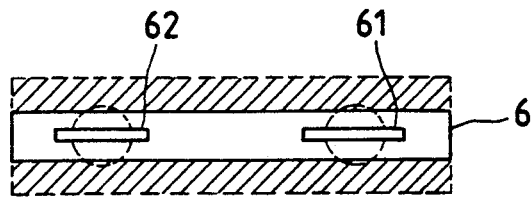
Figure 4:
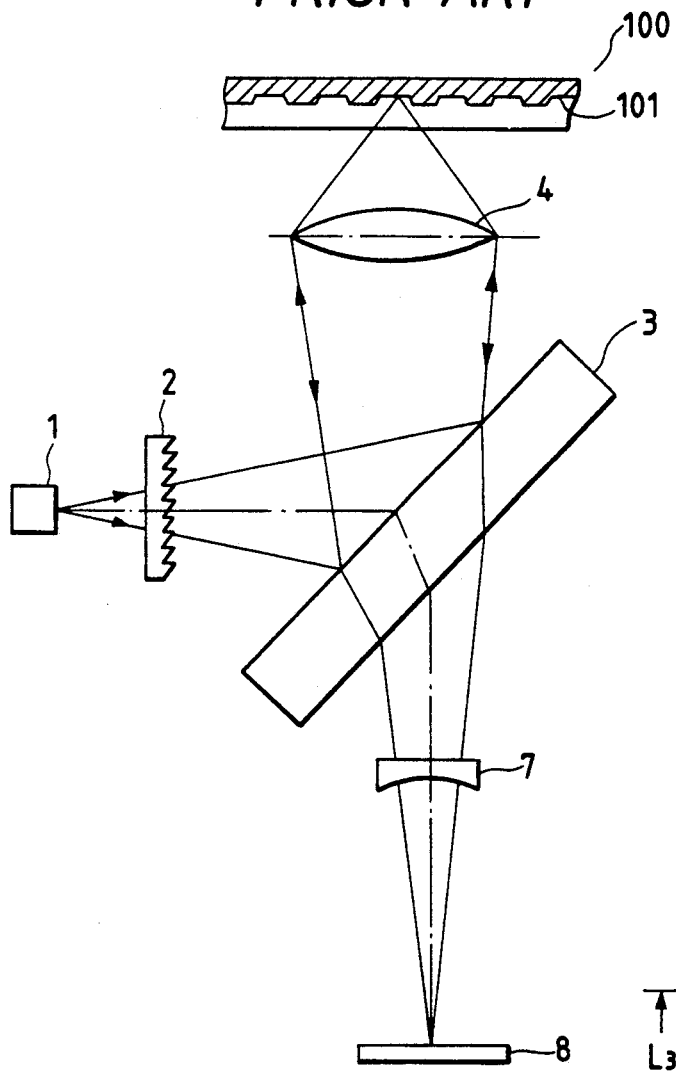
FIG. 4 is a diagram showing the arrangement of a conventional optical data recording and reproducing apparatus.
Figure 5:
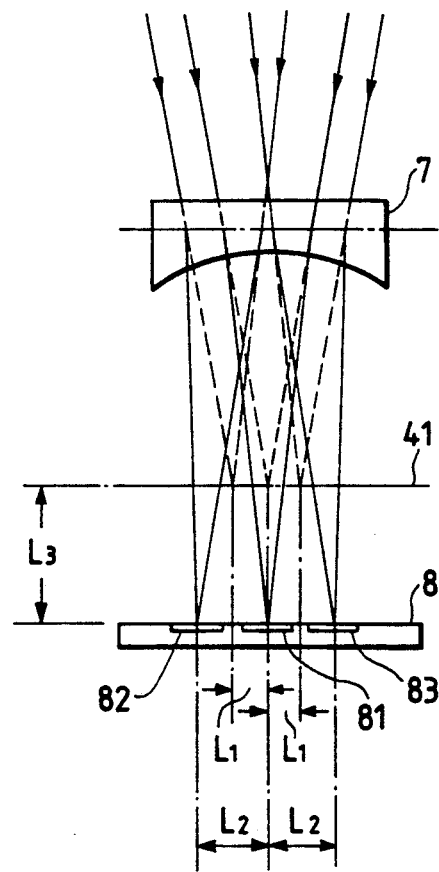
FIG. 5 is an enlarged diagram showing a part of the conventional apparatus of FIG. 4.

In the above-described embodiment, the plane parallel plate 3 is inclined in the direction of diffraction of the diffraction grating 2. However, the plane parallel plate 3 may be set perpendicular to the direction of diffraction of the diffraction grating 2. In this case, the signal light beams are produced as indicated by $I_0$, $I_{+12}$, and $I_{-12}$ (FIG. 3A) when applied to the second optical detector 6 from the plane parallel plate. Accordingly, the photo-diodes 61 and 62, as shown in FIG. 3D, are longitudinally arranged to receive the signal light beams $I_{+12}$ and $I_{-12}$ corresponding to the auxiliary light beams, respectively.

As described above, the output light beam of the light source is diffracted by the diffraction grating into the three light beams, including the main light beam of the 0-th order of diffraction and the auxiliary light beams of the +1st and −1st orders of diffraction. These three light beams are reflected by the first surface of the plane parallel plate so that they are applied through the objective optical system to the recording medium. Portions of the three signal light beams from the recording medium are transmitted through the second surface of the plane parallel plate while being subjected to astigmatism, and the remaining portions are reflected by the second surface while being subjected to astigmatism so that they are transmitted back through the first surface. The main light beam (i.e., the 0-th order of diffraction) is received by the first detecting means. The remaining two light beams (i.e., the auxiliary light beams corresponding to the +1st and −1st order of diffraction) are received by the second optical detector wherein a tracking error signal is produced.

As a result, the second optical detector can be miniaturized in the direction of arrangement of the light source. Moreover, the second optical detector will not mechanically interfere with the output light beam of the light source. Furthermore, being miniaturized as described above, the second detecting means can be positioned very close to the light source and this provides a greater degree of freedom in positioning other components of the apparatus.

There has thus been shown and described a novel optical recording and reproducing apparatus which fulfills all the objects and advantages sought therefor. Many changes, modifications, variations, and other uses and applications of the subject invention will, however, become apparent to those skilled in the art after considering the specification and the accompanying drawings which disclose preferred embodiments thereof. All such changes, modifications, variations, and other uses and applications which do not depart from the spirit and scope of the invention are deemed to be covered by the invention which is limited only by the claims which follow.

What is claimed is:

1. An optical image recording and reproducing apparatus comprising:

a light source for generating a light beam to read data from the recording surface of a recording medium;

a diffraction grating for diffracting the generated light beam into three light beams comprising a main light beam of the 0-th order of diffraction, a first auxiliary light beam of the +1st order of diffraction, and a second auxiliary light beam of the −1st order of diffraction;

a plane parallel plate comprising a first surface in parallel with a second surface, said first surface for receiving and transmitting said three light beams to said recording surface, and said second surface for receiving and partially reflecting three signal light beams reflected by said recording surface;

a first optical detector for detecting said main light beam of said signal light beams passing through said second surface of said plane parallel plate and for outputting an RF signal and a focus servo control signal in accordance with said detected main light beam; and a second optical detector for detecting said first and second auxiliary light beams reflected by said second surface and for producing a tracking error signal in accordance with said detected first and second auxiliary light beams.

2. An optical image recording and reproducing apparatus as defined in claim 1, further comprising an objective lens for focusing said three light beams reflected by said first surface of said plane parallel plate on to the recording surface of said recording medium.

3. An optical image recording and reproducing apparatus as defined in claim 1, wherein said plane parallel plate is arranged to reflect said three light beams in a vertical manner and wherein said second optical detector comprises photo diodes vertically arranged to receive said first and second auxiliary light beams.

4. An optical image recording and reproducing apparatus as defined in claim 1, wherein said plane parallel plate is arranged to reflect said three light beams in a diagonal manner and wherein said second optical detector comprises photo diodes diagonally arranged to receive said first and second auxiliary light beams.

5. An optical image recording and reproducing apparatus as defined in claim 1, wherein said plane parallel plate is arranged perpendicular to a direction of diffraction of said diffraction grating and wherein said second optical detector comprises photo diodes longitudinally arranged to receive said first and second auxiliary light beams.

6. An optical image recording and reproducing apparatus as defined in claim 2, wherein said first optical detector comprises a four-division photo-diode in a front focal plane of said objective lens.

7. An optical image recording and reproducing apparatus as defined in claim 2, wherein said second optical detector comprises photo- diodes behind a front focal plane of said objective lens.

8. An optical image recording and reproducing apparatus as defined in claim 7, wherein said photo-diodes are elongated and rectangular in shape.

9. An optical image recording and reproducing apparatus as defined in claim 1, wherein said plane parallel plate comprises a transparent medium.

* * * * *